United States Patent
Brooks et al.

(10) Patent No.: US 10,574,761 B2
(45) Date of Patent: Feb. 25, 2020

(54) MANAGING CONNECTIONS FOR DATA COMMUNICATIONS FOLLOWING SOCKET FAILURE

(71) Applicant: INTERNATIONAL BUSINESS MACHINES CORPORATION, Armonk, NY (US)

(72) Inventors: Michael D. Brooks, Southampton (GB); Alan Hollingshead, Eastleigh (GB); Julian Horn, Eastleigh (GB); Philip Wakelin, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 15/802,535

(22) Filed: Nov. 3, 2017

(65) Prior Publication Data
US 2019/0014183 A1    Jan. 10, 2019

Related U.S. Application Data

(63) Continuation of application No. 15/643,035, filed on Jul. 6, 2017.

(51) Int. Cl.
*G06F 15/16* (2006.01)
*H04L 29/08* (2006.01)
(Continued)

(52) U.S. Cl.
CPC ........ *H04L 67/141* (2013.01); *H04L 41/0654* (2013.01); *H04L 67/145* (2013.01); *H04L 67/148* (2013.01); *H04L 69/40* (2013.01)

(58) Field of Classification Search
CPC . H04L 4/0654; H04L 67/141; H04L 41/0654; H04L 67/145; H04L 67/148; H04L 69/40
See application file for complete search history.

(56) References Cited

U.S. PATENT DOCUMENTS 5,754,752 A * 5/1998 Sheh .................. G06F 11/1443
                                                      709/227
7,327,670 B2   2/2008 Sprague et al.
(Continued)

FOREIGN PATENT DOCUMENTS

EP         1277355 B1     6/2016

OTHER PUBLICATIONS

Brooks, et al.; "Managing Connections for Data Communications Following Socket Failure"; U.S. Appl. No. 15/643,035, filed Jul. 6, 2017.
(Continued)

*Primary Examiner* — Davoud A Zand
*Assistant Examiner* — Dixon F Dabipi
(74) *Attorney, Agent, or Firm* — Cantor Colburn LLP; Steven Chiu

(57) ABSTRACT

An apparatus, computer-implemented method and computer program product manages connections for data communication. A first system initiates a process for establishing a new connection pipe of a socket-based connection between the first system and a second system. The new connection pipe is a replacement for an existing connection pipe. The existing connection pipe is accessed by a respective existing socket at each of the first and second systems. The first system receives acknowledgement from the second system confirming that the replacement connection pipe is established. The replacement connection pipe is accessed by a respective replacement socket at each of the first and second systems. The first system re-associates sessions of the existing socket at the first system to the replacement socket at the first system.

7 Claims, 5 Drawing Sheets

(51) Int. Cl.
*H04L 12/24* (2006.01)
*H04L 29/14* (2006.01)

(56) References Cited

U.S. PATENT DOCUMENTS

| | | | |
|---|---|---|---|
| 8,335,853 B2 | 12/2012 | Bharrat | |
| 9,276,979 B2 | 3/2016 | Reza | |
| 2004/0207957 A1* | 10/2004 | Kasajima | G11B 5/4826 |
| | | | 360/234.6 |
| 2008/0075048 A1* | 3/2008 | Suszko | H04L 67/141 |
| | | | 370/338 |
| 2011/0153834 A1* | 6/2011 | Bharrat | G06F 11/1482 |
| | | | 709/227 |
| 2014/0207957 A1 | 7/2014 | Zhang et al. | |
| 2015/0032856 A1* | 1/2015 | Ishikawa | H04N 21/4884 |
| | | | 709/219 |
| 2017/0223712 A1* | 8/2017 | Stephens | H04W 4/90 |

OTHER PUBLICATIONS

List of IBM Patents or Patent Applications Treated as Related; Date Filed: Nov. 3, 2017, 2 pages.

Bolla et al.; "Seamless and transparent migration for TCP sessions"; IEEE 25th International Symposium on Personal, Indoor and Mobile Radio Communications; 2014; pp. 1469-1473.

Gerofi et al.; "Live Migration of Process Maintaining Multiple Network Connections"; IPSJ Online Transactions vol. 3; Mar. 2010; pp. 13-24.

Huan et al.; "A mechanism based on Netfilter for live TCP migration in cluster"; Ninth International Conference on Grid and Cloud Computing; 2010; pp. 218-222.

\* cited by examiner

MANAGING CONNECTIONS FOR DATA COMMUNICATIONS FOLLOWING SOCKET FAILURE

DOMESTIC AND/OR FOREIGN PRIORITY

This application is a continuation of U.S. application Ser. No. 15/643,035, titled "MANAGING CONNECTIONS FOR DATA COMMUNICATIONS FOLLOWING SOCKET FAILURE" filed Jul. 6, 2017, the contents of which are incorporated by reference herein in its entirety.

BACKGROUND

The present disclosure relates to data communications, and more specifically, to the management of connections for data communication in a computing system or network following socket failure.

SUMMARY

Embodiments of the present invention provide a computer-implemented method. A non-limiting example of the computer-implemented includes initiating, by a first system, a process for establishing a new connection pipe of a socket-based connection between the first system and a second system. The new connection pipe is a replacement for an existing connection pipe that is accessed by a respective existing socket at each of the first and second systems. The computer-implement method includes receiving, by the first system, acknowledgement from the second system, in which the acknowledgement confirms that the replacement connection pipe is established. The replacement connection pipe is accessed by a respective replacement socket at each of the first and second systems. The computer-implement method includes re-associating, by the first system, sessions of the existing socket at the first system to the replacement socket at the first system.

Embodiments of the present invention provide an apparatus. A non-limiting example of the apparatus includes a first device for communicating data over at least one socket-based connection, in which the first device includes a connection manager. The connection manager is configured to initiate a process for establishing a new connection pipe of a socket-based connection between the first device and a second device. The new connection pipe is a replacement for an existing connection pipe that is accessed by a respective existing socket at each of the first and second devices. The connection manager is further configured to receive acknowledgement from the second device, in which the acknowledgement confirms that the replacement connection pipe is established. The replacement connection pipe is accessed by a respective replacement socket at each of the first and second devices. The connection manager is further configured to re-associate sessions of the existing socket at the first device to the replacement socket at the first device.

Embodiments of the present invention provide a computer program product. A non-limiting example of the computer program product a computer readable storage medium having program instructions embodied therewith. The program instructions are executable by a processor to cause the processor to initiate, by a first system, a process for establishing a new connection pipe of a socket-based connection between the first system and a second system. The new connection pipe is a replacement for an existing connection pipe that is accessed by a respective existing socket at each of the first and second systems. The program instructions cause the processor to receive, by the first system, acknowledgement from the second system, in which the acknowledgement confirms that the replacement connection pipe is established. The replacement connection pipe is accessed by a respective replacement socket at each of the first and second systems. The program instructions cause the processor to re-associate, by the first system, sessions of the existing socket at the first system to the replacement socket at the first system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
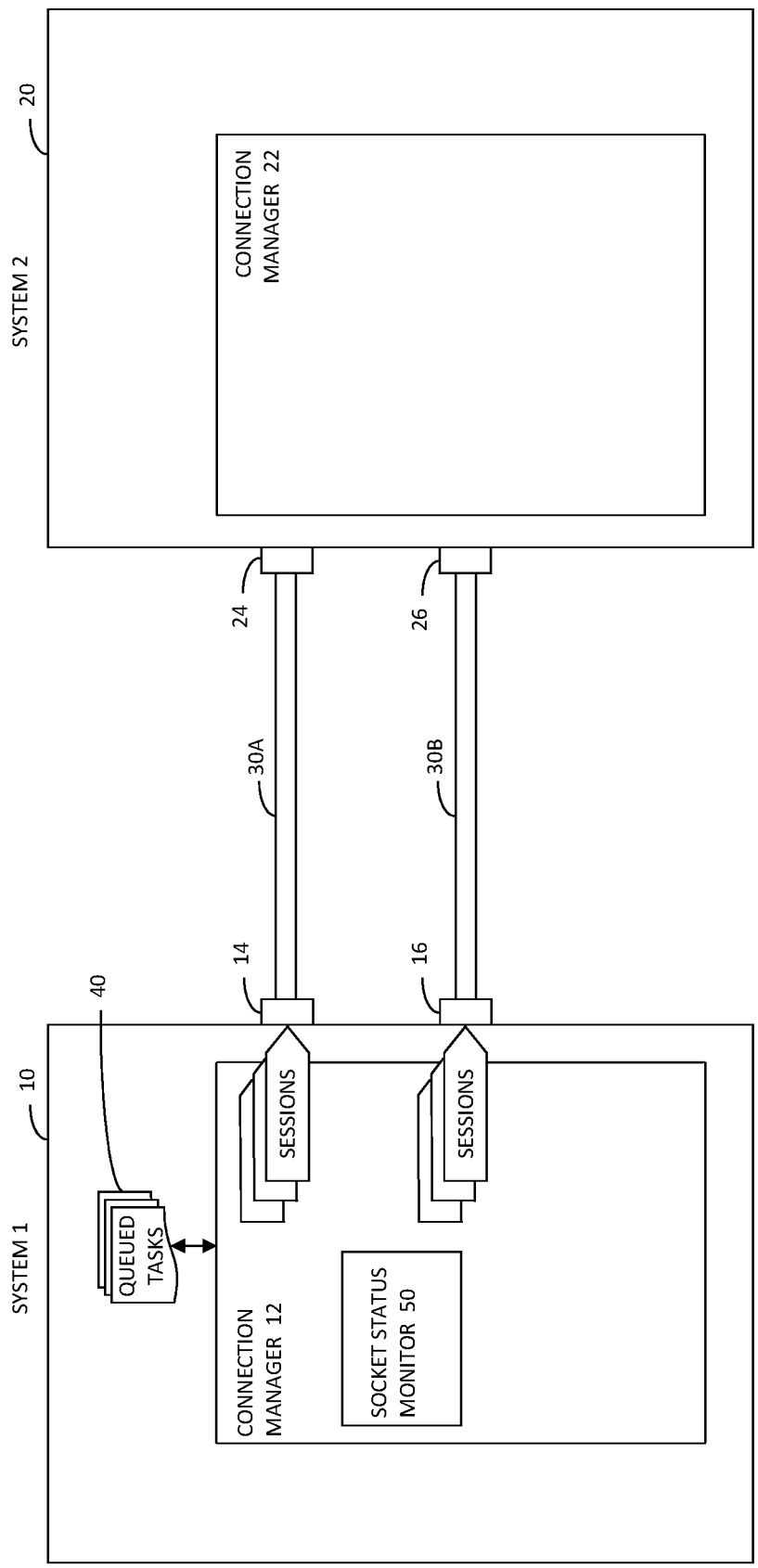
FIG. 1 is a block diagram showing connections for the communication of data from a first system to a second system.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

In computing systems and networks, connections may be used for communicating data between components and devices. A connection may be regarded as a path for the communication of data between two nodes of a system or network. In some applications, a path may be established between two nodes for the communication of large volumes of data relating to a number of different, and sometimes unrelated, processes. For example, a connection may be established between two transaction processing systems, for the transfer to data relating to a large number of different processing tasks, transactions or workload. Such a communication path or connection may be considered to be long-lived. Long-lived connections are established using techniques that are different from those used for establishing short-lived connections, and have different management requirements. Typically, long-lived connections are "stateful" connections, whereby information about each connection is maintained in relation to data communications thereon for connection management.

Existing techniques for establishing long-lived paths for data communications between two nodes of a computing system or network acquire a negotiated connection with a predefined number of connection pipes, with complementary sockets (also referred to herein as "partner sockets") at each node. For example, a connection for the transfer or data from one transaction processing system node to another transaction processing system node may comprise two sockets, a primary socket and a secondary socket, at each node of the connection. Data for transfer from the first transaction processing system to the other system is allocated to one of the sockets, and is transferred by serial communication across the corresponding connection pipe of the connection via the allocated, primary or secondary socket. The use of socket-based connections having multiple sockets/connection pipes provides increased bandwidth for data transfer and improves the resilience of the connection, and thus the performance of the system or network.

Conventionally, once a socket-based connection has been established, it cannot be altered. Accordingly, if problems arise with one of the sockets and/or connection pipes (e.g., a socket at one end of a connection pipe malfunctions or stalls) it is not possible to increase the number of connection pipes. In consequence, the bandwidth available for data transfer is reduced to that of the unaffected connection pipe(s). Thus, data transfer may be delayed (e.g., data relating to tasks is held up in the queue of the socket that is malfunctioning or stalling), leading to delays in the processing of tasks, transactions or workload and thus reducing performance of the system or network.

In order to address the above issues, an existing socket-based connection may be terminated and recycled, involving the negotiation and establishment of a new socket-based connection, typically with the same number of connection pipes. This process of terminating and recycling the connection requires significant connection management processing. Furthermore, since all connection pipes of the connection are terminated and recycled, data transfer from the unaffected connection pipe(s) is additionally delayed in the process.

Accordingly, example implementations of the present disclosure enable replacement of a failing connection pipe, of an existing socket-based connection between two nodes of a system or network, with a new connection pipe. Example implementations of the present disclosure further enable the automatic re-allocation of data from a failing socket to a new, replacement socket, for transfer across the replacement connection pipe. In particular, example implementations of the present disclosure may re-associate sessions of a failing socket to the replacement socket so that data allocated to one or more of the sessions can continue to be transferred seamlessly between the nodes following failure of a connection pipe and/or socket.

Example implementations of the present disclosure relate to network nodes, each comprising a component or device (e.g., software, firmware and/or hardware) that permits data communications in the form of messages to be sent and received across a network connection to another node. In the example implementations described below, a connection between a pair of nodes comprises a socket-based connection having multiple connection pipes (herein also referred to simply as "pipes"). As the skilled person will appreciate, a connection pipe comprises a virtual path through the system or network from one node to another node that is managed by a network controller. Each network node makes use of a single socket to access a connection pipe in order to send and receive messages and for communications to and from the network controller. Thus, each connection pipe is associated with a pair of complementary or partner sockets at the respective nodes associated with the connection. Accordingly, in the following description, references to a particular pipe of a socket-based connection are synonymous with the pair of sockets (referred to herein as "socket pair") providing access to the pipe at each end thereof.

As the skilled person will further appreciate, a node typically uses one or more sessions to permit one or more conversations to take place using a specific pipe. A conversation is a set of messages and their responses that take place between the pair of nodes (herein referred to as "message exchange sequence"). A conversation may have no more than one session for a particular pipe of a socket-based connection. Thus, for example, a conversation may relate to a particular task or transaction of a transaction processing system or the like, which is allocated to a particular session for the lifetime thereof. As the skilled person will appreciate, multiple conversations, which are allocated to respective sessions, may take place concurrently over the same pipe of a socket-based connection, as described further below. Unless otherwise stated, terms used throughout the description should be understood in the above context.

In the following description of the example implementations of the present disclosure, a socket-based connection between transaction processing systems is disclosed. As the skilled person will appreciate, the principles of the present disclosure are not limited to use with transaction processing systems but may be implemented in relation to other suitable types of components or devices forming a node of a system or network that transfers data over long-lived connections. In the drawings, the same or similar features are assigned the same or similar reference numerals.

FIG. 1 shows an arrangement of connections for the communication of data from a first transaction processing system 10 ("System 1") to a second transaction processing system 20 ("System 2"). Transaction processing systems 10, 20 may comprise transaction processing servers, or monitors for transaction processing servers or regions, which perform processing of transactions, tasks and workloads, as described herein and well known to a person skilled in the art. First system 10 comprises a connection manager 12 for managing connections 30. For simplicity, FIG. 1 only shows a single connection 30 from first system 10 to second system 20. As the skilled person will appreciate, connection manager 12 may manage the transfer of data over further connections 30 from first system 10 to a plurality of other systems (not shown). In the example shown in FIG. 1, first system 10 transfers data to second system 20 over a socket-based connection 30 via two sockets, a primary socket 14 and a secondary socket 16. In particular, connection manager 12 may allocate data relating to transaction processing tasks 40 (herein referred to simply as "tasks") scheduled for transfer from first system 10 to second system 20 to a session associated with either the primary socket 14 or the secondary socket 16.

Similarly, second system 20 comprises a connection manager 22 for managing connections 30. In the example shown in FIG. 1, second system 20 receives data from first system 10 over a socket-based connection 30 via two sockets, a primary socket 24 and a secondary socket 26. Thus, data is transferred from first system 10 to second system 20 over either a primary connection pipe 30A between primary socket 14 of system 10 and primary socket 24 of second system 20, or a secondary connection pipe 30B between secondary socket 16 of system 10 and secondary socket 26 of system 20. Data relating to a task 40 allocated to a session is transferred from first system 10 to second system 20 over either the primary pipe 30A or the secondary pipe 30 by serial data communication. As indicated above, once a task 40, scheduled for transfer from first system 10 to second system 20, is allocated to a session, and thus for transfer of data via either the primary or secondary socket, the allocation cannot be changed for the lifetime of the task 40.

Connection manager 12 may allocate a session to each new task 40, and may manage the scheduling of the data transfer over the corresponding connection 30. In particular, first system 10 typically processes a large number of tasks 40 in parallel. When system 10 identifies that data relating to a new task 40 should be transferred to second system 20, the first system 10 may send a request to the connection manager 12 for access to the connection 30. In response to the request, the connection manager 12 may provide a token (herein referred to as "session token"), which allocates the new task 40 to a session. The allocated session may be associated with the primary socket 14 or the secondary socket 16 of first system 10. The session token may be used by connection manager 12 for scheduling and managing data transfer across the connection 30. Once a session token has been allocated, data relating to the new task 40 (or a corresponding identifier for the task or data) may be placed in a queue of the corresponding socket 14 or 16, from which data is transferred serially across pipe 30A or 30B, respectively. As the skilled person will appreciate, a paired session of the counterpart socket 24 or 26 will similarly be allocated by the connection manager 22 of the second system 20, for the bidirectional exchange of messages associated with the task 40. As the skilled person will appreciate, once allocated, paired sessions may use a single session token for the session pair or a separate session token for each session of the session pair, where the respective session tokens have a paired relationship. Connection manager 12 comprises a socket status monitor 50 for monitoring the sockets, for instance by monitoring the data transfer from primary and secondary sockets 14 and 16 across the corresponding primary and secondary pipes 30A and 30B. In particular, socket status monitor 50 maintains a status of the sockets of the socket-based connections managed by the connection manager 12.

As described above, problems may arise with the connection 30 between the first system 10 and the second system 20. For example, the primary socket 14 of the first system 10 may malfunction, leading to a slowdown in data transfer over pipe 30A. This may eventually cause the primary socket 14 to stall (i.e., stop functioning). Thus, a backlog of tasks 40 having data for transfer, which are allocated to sessions associated with the primary socket 14, is accumulated in the corresponding queue. The malfunctioning or stalled status of the primary socket 14 may be identified by the socket status monitor 50 of connection manager 12 or otherwise, and an alert may be issued to a system administrator who may carry out remedial action manually. For instance, the system administrator may initiate a process to terminate the socket-based connection 30 with the failing or stalled socket and establish a new, replacement socket-based connection. In co-pending U.S. patent application Ser. No. 15/220,494 filed 27 Jul. 2016, which is incorporated herein by reference, the present inventors proposed a technique for automatically establishing a new connection pipe of an existing socket-based connection using a so-called "enhanced socket handler", as outlined below in relation to FIG. 2.

Figure 2:
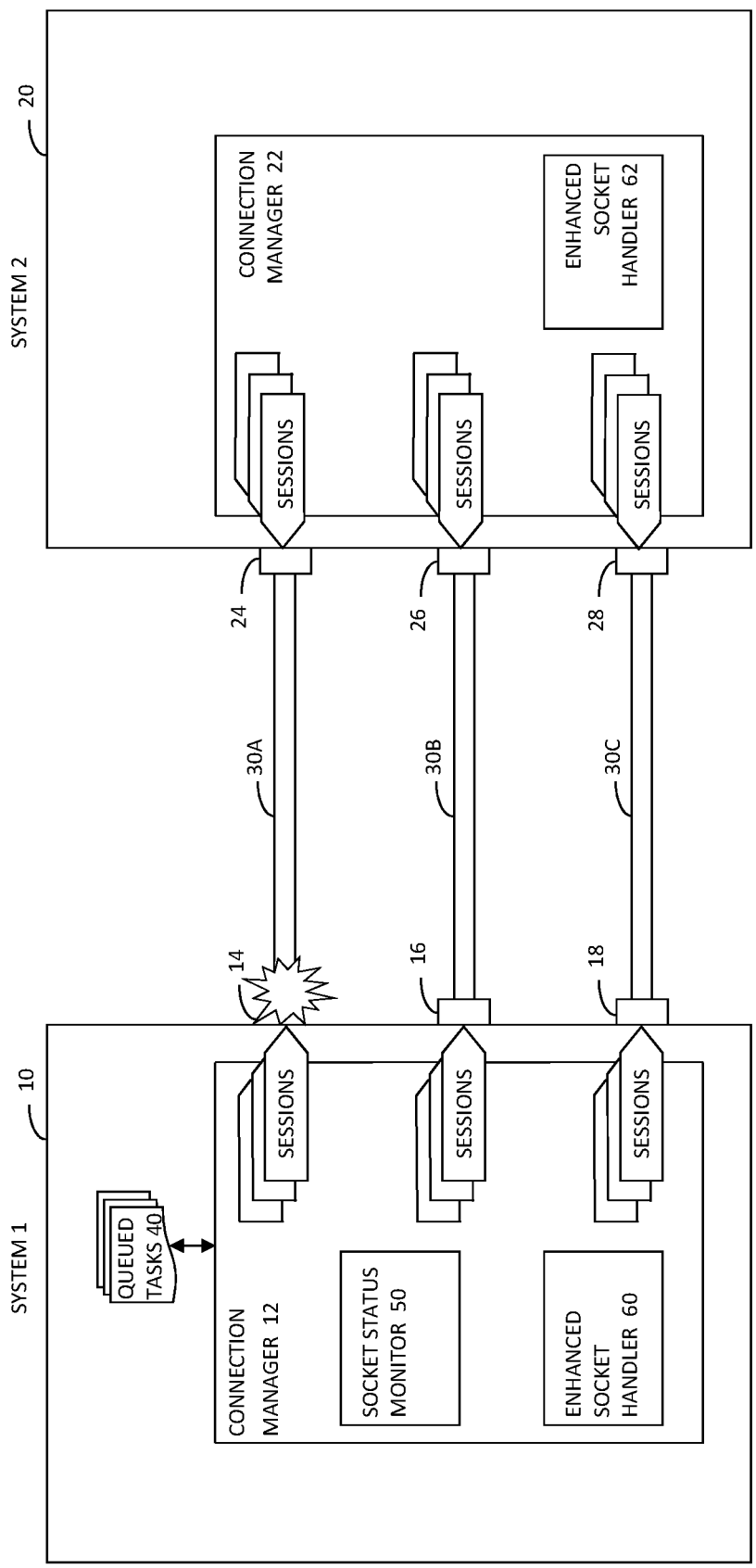
FIG. 2 is a block diagram similar to FIG. 1, showing connections for the communication of data from a first system to a second system following failure of a socket of the first system.

FIG. 2 shows an arrangement of connections for the communication of data from a first transaction processing system 10 ("System 1") to a second transaction processing system 20 ("System 2") when the primary socket 14 of the first system 10 has malfunctioned or stalled and a new, third pipe 30C is established. The first and second systems 10 and 20, and socket-based connection 30 comprising primary and secondary pipes 30A and 30B, are equivalent to those of FIG. 1, and so will not be described in detail. Connection manager 12 of the first system 10 comprises an enhanced socket handler 60 in addition to a socket status monitor 50.

Similarly, connection manager 22 of the second system comprises an enhanced socket handler 62, which may be in addition to a socket status monitor (not shown). As shown in FIG. 2, connection manager 12 of first system 10 uses enhanced socket handler 60 to establish a third socket 18 and connection manager 22 of second system 20 uses enhanced socket handler 62 to establish a third socket 28. Thus, a third pipe 30C, between the third sockets 18 and 28 of the first and second systems 10, 20, is added to the existing connection 30, comprising primary and secondary pipes 30A and 30B, for the transfer of data relating to tasks 40 from the first system 10 to the second system 20.

In accordance with example implementations of the present disclosure, the third pipe 30C and associated third socket pair 18, 28 may be established as a replacement for the primary pipe 30A and associated socket pair 14, 24. In particular, the third pipe 30C may be established in response to the socket status monitor 50 of the connection manager 12 identifying the malfunctioning or stalled status of primary socket 14. As the skilled person will appreciate, the method for identifying a malfunctioning, stalled or other negative status of a socket and/or associated pipe requiring the establishment of a replacement pipe is dependent upon application and/or user requirements. One suitable technique for identifying a stalled socket status is proposed by the present inventors in co-pending U.S. patent application Ser. No. 15/092,648 filed 7 Apr. 2016, which is incorporated herein by reference. In particular, the present inventors proposed determining that a socket of a socket-based connection is stalled, when a monitored connection performance parameter is less than or equal to a predetermined threshold.

As the skilled person will further appreciate, the method for establishing the third pipe 30C and associated socket pair 18, 28 as a replacement for the primary pipe 30A and associated primary socket pair 14, 24 is similarly dependent upon application and/or user requirements. One suitable technique for establishing a new pipe, which may be used as a replacement pipe, is proposed by the present inventors in co-pending U.S. patent application Ser. No. 15/220,494 filed 27 Jul. 2016 supra. In particular, the present inventors proposed a so-called enhanced capability exchange (CAPEX) message sequence for establishing a new pipe, in which a first system sends an enhanced CAPEX request message to a second system, including a request to change the number of connection pipes on an established socket-based connection between the first system and the second system. The second system sends an enhanced CAPEX response message to the first system, in which the request to change the number of connection pipes is accepted. The first system then changes the number of connection pipes, accordingly. In accordance with example implementations of the present disclosure, the proposed technique for establishing a new pipe, using the so-called enhanced CAPEX message sequence, may be modified for use in establishing a replacement pipe, as described below.

In accordance with example implementations of the present disclosure, a backlog of data relating to tasks 40 (or equivalent) in a queue associated with the malfunctioning or stalled primary socket 14 may be re-allocated automatically to the replacement third socket 18. In particular, the sessions of the primary socket 14 may be re-associated with the replacement third socket 18. In this way, data relating to tasks 40 that have been allocated to sessions of the primary socket 14 are re-allocated automatically to the replacement third socket, as described below with reference to FIG. 3.

Figure 3:
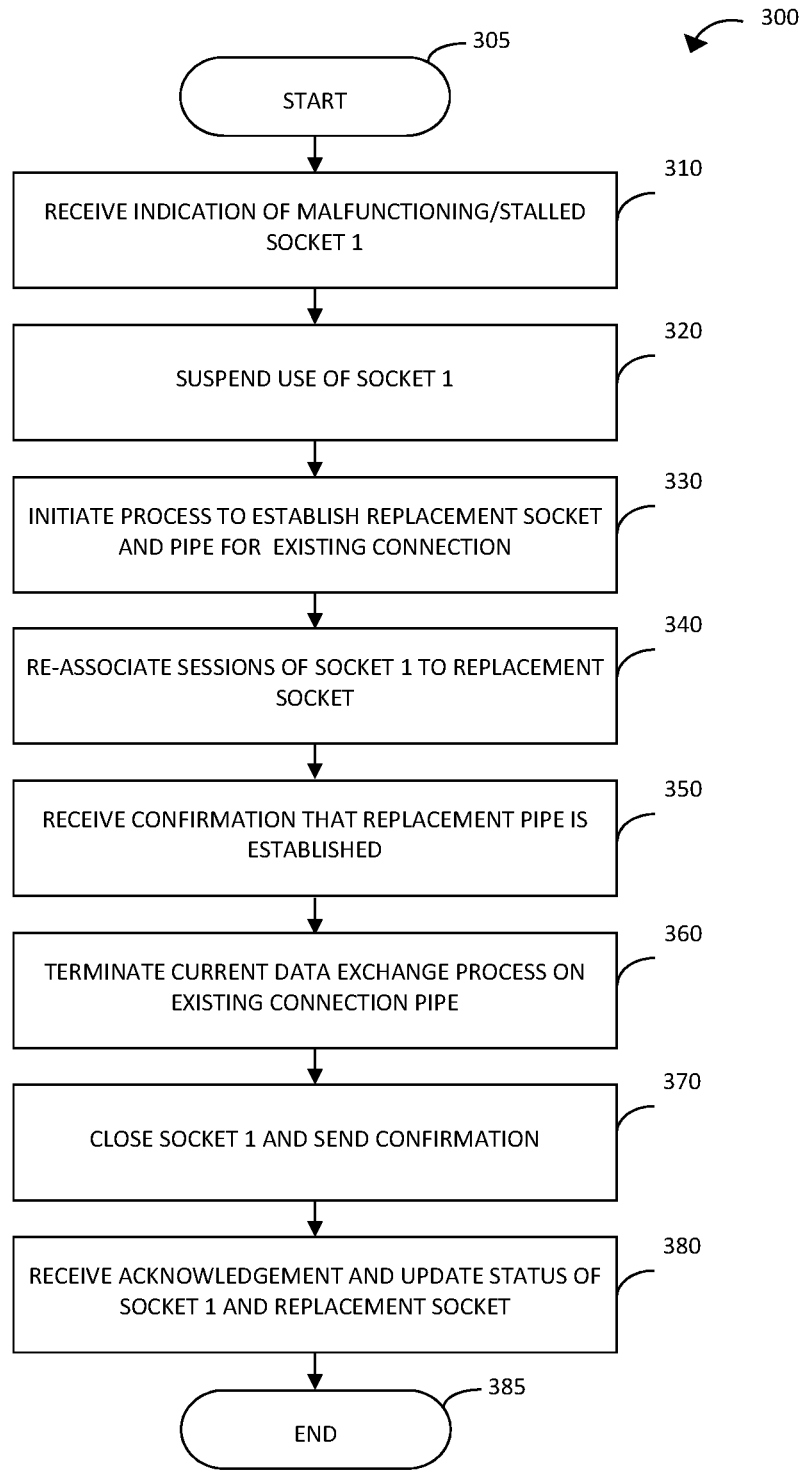
FIG. 3 is a flow diagram illustrating a method for managing connections in the first system of FIG. 2 according to an example implementation of the present disclosure.

FIG. 3 is a flowchart illustrating a method 300 for managing connections in accordance with an example implementation of the present disclosure. In particular, although not exclusively, the method 300 may be performed by the connection manager 12 in conjunction with the enhanced socket handler 60 of the first system 10 of FIG. 2. For instance, the method 300 may be performed when a socket 14 of a socket-based connection 30 of the first system 10 is malfunctioning, stalled or otherwise requires replacement.

The method 300 starts at step 305. At step 310, the method receives an indication that an existing socket (herein referred to as "Socket 1") of a socket-based connection is malfunctioning, stalled or otherwise requires replacement. For example, a socket status monitor for monitoring sockets of connections of a component or device may provide the indication received in step 310 in response to detecting a negative status of Socket 1.

At step 320, the method suspends use of Socket 1. For example, step 320 may update the status of Socket 1 so as to prevent allocation of sessions, associated with Socket 1, to new tasks or other data. As the skilled person will appreciate, a connection manager of a component or device may maintain a data record of sockets of its socket-based connections for which sessions are available for allocation to new tasks or data. Accordingly, step 320 may mark the data record associated with Socket 1 to indicate that it is unavailable, thereby suspending use thereof. For example, a data record of the sessions of a socket, such as a "session set object", may be maintained for controlling the sessions for accessing the socket, whereby the session set object is identified by a token (or equivalent) that identifies the particular socket (herein referred to as "socket token"). Each session set object may include an indicator of the availability of the socket sessions for allocation of new tasks. Accordingly, step 320 may mark the session set object indicator (e.g., change an indicator state or setting) to indicate that the Socket 1 is unavailable. As the skilled person will appreciate, various other techniques for suspending use of a socket, consistent with management and control techniques for managing socket-based connections, are possible and contemplated by the present disclosure.

At step 330, the method initiates a process to establish a new pipe for the socket-based connection as a replacement pipe. Various suitable process may be used to establish a replacement pipe of the socket-based connection to a remote component or device. For example, the method may open a new temporary socket and initiate a messaging sequence to establish a replacement pipe. The messaging sequence may comprise an enhanced capability exchange (CAPEX) messaging sequence as described above, and may be performed using an enhanced socket handler as proposed by the present inventors in co-pending U.S. patent application Ser. No. 15/220,494 filed 27 Jul. 2016 supra. In particular, an enhanced CAPEX messaging sequence may be initiated by sending an enhanced CAPEX request message with a field, flag or other indicator that a new pipe is to be established on an existing socket-based connection.

In accordance with example implementations of the present disclosure, the enhanced CAPEX messaging sequence may be modified to automatically establish the new pipe as a replacement pipe of the socket-based connection. In some example implementations of the present disclosure, the enhanced CAPEX request message may be modified to include an additional field, flag or other indicator that the new pipe is intended to replace an existing pipe. The enhanced CAPEX request message may further contain an identifier of the existing socket, Socket 1, providing access to the existing pipe. For example, the identifier of Socket 1 may comprise the above-mentioned socket token that uniquely identifies a socket (or pair of partner sockets) of a particular pipe, which may be used in data communications across that pipe. The identifier (e.g., socket token) may enable the remote component or device to identify its complementary socket or partner socket and suspend use thereof, as described below with reference to FIG. 4. In other example implementations, the enhanced CAPEX request message may not be modified. In this case, further messages may be sent and received as part of a modified enhanced CAPEX messaging sequence to indicate that the new pipe is intended to replace an existing pipe. Such further messages may further include an identifier of Socket 1.

At step 340, the method re-associates sessions of the existing socket, Socket 1, to the replacement socket. Thus, the sessions of Socket 1 become sessions of the replacement socket. In particular, the method may transfer ownership of the set of sessions of Socket 1, which includes both sessions currently allocated to tasks and/or data in a queue for transfer from Socket 1 and unallocated sessions, to the replacement socket. Ownership of the sessions may be transferred by re-labelling the sessions, so as to change the identity of the socket with which the sessions are associated. In particular, when a data record of the sessions associated with a socket is used for connection management, step 340 may change the identifier of the socket associated with the data record for Socket 1 to identify the replacement socket. For example, step 340 may change the socket token for a session set object associated with Socket 1 to the socket token of the replacement socket. As the skilled person will appreciate, various other techniques for re-associating sessions from Socket 1 to the replacement socket, consistent with management and control techniques for managing socket-based connections, are possible and contemplated by the present disclosure. For example, the set of sessions may be copied or moved from a data record for Socket 1 to a data record for the replacement socket. By re-associating the sessions of Socket 1 to the replacement socket, the session tokens already allocated to tasks and/or data in the queue remain valid and can be used for data transfer from the replacement socket. Thus, tasks and/or data in the queue may continue to be transferred seamlessly from the replacement socket. In addition, since the sessions are re-associated, the order of the tasks and/or data in the queue may be preserved. As described below with reference to FIG. 4, a corresponding process is carried out at the remote component or device node to re-associate the paired sessions of the counterpart or partner to Socket 1 to sessions of a counterpart replacement socket of the replacement pipe.

At step 350, the method receives confirmation that the replacement pipe for the socket-based connection is established. For example, the method may receive a final acknowledgement of a messaging sequence, such as the above-described enhanced CAPEX messaging sequence, from the remote component or device. In particular, the final acknowledgement may confirm that a new partner socket has been opened as a permanent replacement socket, thus indicating that the new pipe is fully established as the replacement pipe. The final acknowledgement may also confirm that activity of the partner to Socket 1 has been suspended. Optionally, step 350 may initiate creation of a new data record for the replacement socket (e.g., session set object associated with a socket token for the replacement socket), which may be marked to indicate that the replacement socket, and thus the re-associated sessions thereof, is available for the transfer of data.

At step 360, the method terminates the current data exchange process on the existing connection pipe (i.e., from Socket 1). In particular, step 360 may terminate the current conversation involving the transfer of data relating to a current task. As the skilled person will appreciate, when Socket 1 malfunctions or stalls, a current messaging sequence is interrupted and, in consequence, the current task fails. Accordingly, step 360 may terminate the current messaging sequence (e.g., the current task) accessing Socket 1 and raise an error condition. The error condition may then initiate a conventional error recovery process to resend the task and/or data using any suitable error recovery technique, according to application or user requirements. Thus, for instance, an error recovery process may re-allocate the task and/or data to a new session of an available socket. Since Socket 1 is no longer available, the task or data is effectively allocated to a session of another socket for retransmission of the corresponding task or data.

At step 370, the method initiates a process to close the existing socket, Socket 1. Step 370 may additionally send confirmation that Socket 1 has been closed to the remote component or device. At step 380, the method receives acknowledgment from the remote component or device that the counterpart to Socket 1 is closed, and updates the records associated with Socket 1 and the replacement socket. For example, a data record associated with Socket 1 may be marked as closed, and a data record associated with the replacement socket may be marked as available. Thus Socket 1 and its counterpart are now closed, and the replacement socket pair and associated replacement pipe are now available for use. Accordingly, data relating to tasks 40 can now be transmitted across the replacement pipe. The method then ends at step 385.

As the skilled person will appreciate, the steps of the method of FIG. 3 may be carried out in any suitable order, according to implementation requirements. For example, step 340 may be performed before, or concurrently with, step 330. In addition, the messaging sequence may be varied according to application and/or user requirements.

Whilst the method of FIG. 3 may be performed entirely by a connection manager of a node (i.e., a component or device of a system or network), the skilled person will appreciate that the process for establishing the replacement socket and pipe may be performed elsewhere, such as by the enhanced socket handler shown in FIG. 2. Accordingly, step 330, which initiates a process to establish the replacement pipe, may involve the transfer of processing from the connection manager to the enhanced socket handler, for establishing the new pipe. Thereafter, the enhanced socket handler may perform steps 340 to 380. In this way, no additional processing is required by the connection manager, which continues to allocate sessions to new tasks based on the availability of sessions and sockets.

Figure 4:
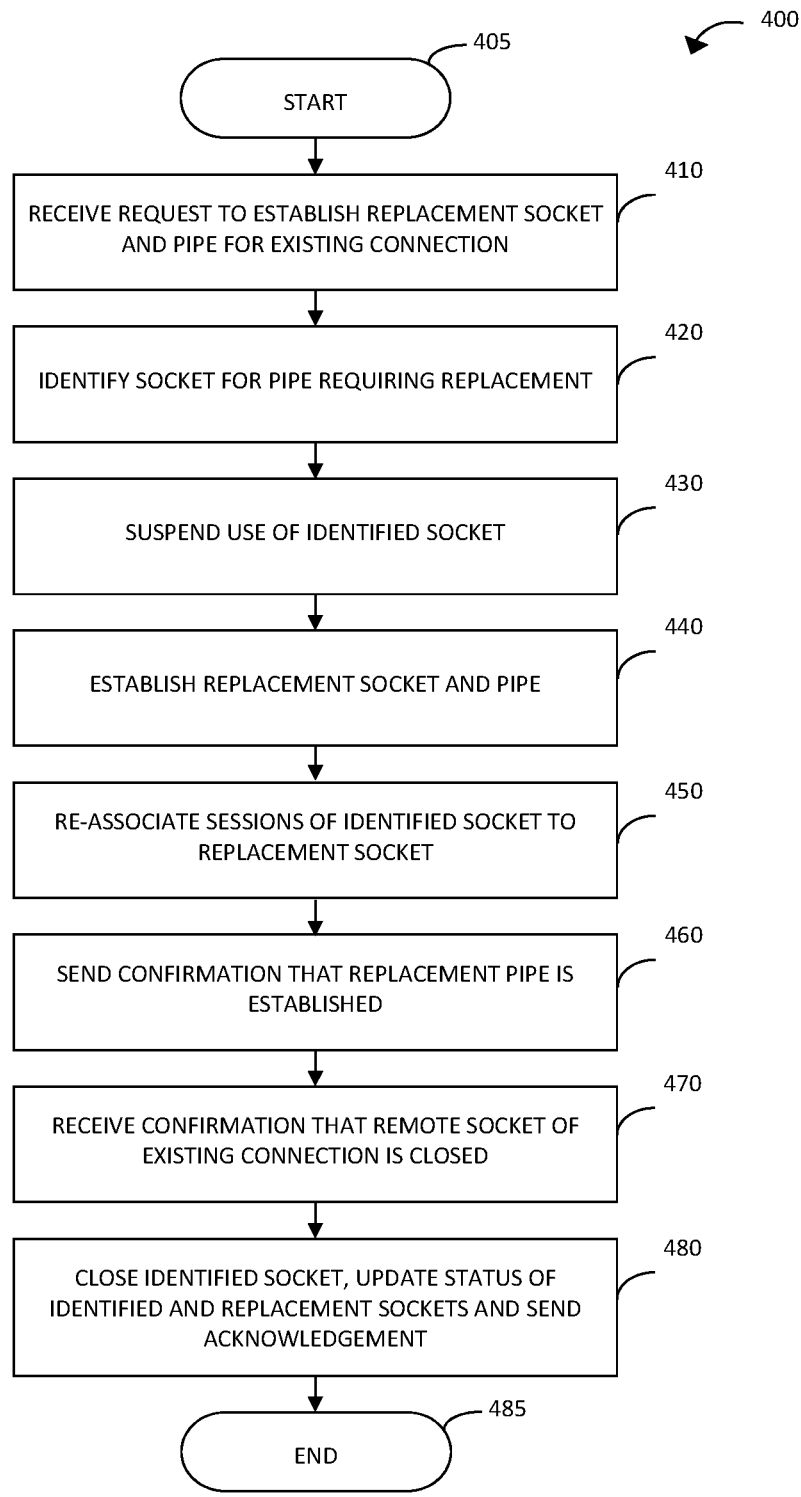
FIG. 4 is a flow diagram illustrating a method for managing connections in the second system of FIG. 2 according to an example implementation of the present disclosure.

FIG. 4 is a flowchart illustrating a method 400 for managing connections in accordance with an example implementation of the present disclosure. In particular, although not exclusively, the method 400 may be performed by the connection manager 22 of the second system 20 of FIG. 2. For instance, the method 400 may be performed by the enhanced socket handler 62 of the connection manager 22 of the second system 20, when a replacement pipe of a socket-based connection 30 between the first system 10 and the second system 20 is required, for example when a socket 14 of the first system 10 is malfunctioning or stalled. As the skilled person will appreciate, the method 400 of FIG. 4 may be performed at a node at one end of a connection whilst with the method 300 of FIG. 3 may be performed concurrently at a node at the other end of the connection.

The method 400 starts at step 405. At step 410, the method receives a request to establish a replacement socket and pipe for an existing socket-based connection. In example implementations of the present disclosure, the request may be received from a remote component or device of the existing connection, sent in accordance with step 330 of the method 300 of FIG. 3, and may involve opening a temporary socket therefor. In example implementations of the present disclosure, the request may be received by an enhanced socket handler of a connection manager and may comprise an enhanced CAPEX request message to establish a new pipe as part of an enhanced CAPEX messaging sequence, as proposed by the present inventors in co-pending US patent application Ser. No. 15/220,494 filed 27 Jul. 2016 supra. In particular, the enhanced CAPEX messaging sequence may be modified, as described above in relation to step 330 of the method of FIG. 3, to indicate that the new pipe is intended to replace an existing pipe and may further contain an identifier of the existing socket at the remote node associated with the pipe to be replaced (e.g., Socket 1 in the method of FIG. 3).

At step 420, the method identifies its complementary or partner socket associated with, and providing access to, the pipe to be replaced (herein referred to as "the identified socket", which is an existing socket partner to Socket 1 in the method of FIG. 3). For example, step 420 may analyze the received request for an identifier (e.g., socket token) of the existing socket associated with the pipe to be replaced at the remote node (e.g., Socket 1 in the method of FIG. 3). Step 420 may use the identifier of the remote socket (e.g., socket token) to identify its corresponding existing partner socket. In particular, as indicated above, a socket token may be a unique identifier for the socket pair associated with a particular pipe or may include separate identifiers for each of the sockets associated with the pipe.

At step 430, the method suspends use of the identified socket (i.e., the partner to Socket 1 in the method of FIG. 3). For example, step 430 may update a status of the identified socket so as to prevent allocation of sessions, associated with the identified socket, to new tasks and/or data. As described above in relation to step 320 of the method of FIG. 3, a connection manager of a component or device may maintain a data record of sockets of socket-based connections for which sessions are available for allocation to new tasks or data. Accordingly, step 430 may mark the data record associated with the identified socket to indicate that it is unavailable, thereby suspending use thereof. For example, and as described above, a data record for a socket, such as a socket session object, may include an indicator of the availability of the socket sessions for allocation of new tasks. Thus, step 430 may mark the session set object indicator to indicate that the identified socket is unavailable.

At step 440, the method establishes the replacement socket and pipe. In particular, step 440 may open or otherwise establish a permanent replacement socket for access to the replacement pipe. As described above, a new socket may be temporarily opened to receive the request to establish a replacement socket and pipe in step 410. Accordingly, step 440 may cause the temporary socket to become permanent. Optionally, step 440 may create a new record for the replacement socket (e.g., session set object associated with a socket token for the replacement socket), and mark data associated with the new socket record to indicate that the replacement socket, and thus the re-associated sessions thereof, is available for the transfer of new tasks or data.

At step 450, the method re-associates sessions from the identified existing socket to the replacement socket. Thus, the sessions of the identified socket become sessions of the replacement socket. In particular, the method may transfer ownership of a set of sessions of the identified socket to the replacement socket. Various suitable techniques may be used to re-associate the sessions, including the techniques described in relation to step 340 of the method of FIG. 3. For example the socket token of the session set object for the identified socket may be changed to the socket token for the replacement socket. The sessions may include both currently allocated sessions, which are paired to the sessions of Socket 1 and unallocated sessions of the identified socket. As described above with reference to FIG. 3, a corresponding process is carried out in step 340 at the remote component or device to re-associate the sessions of Socket 1 to the replacement socket of the new pipe. Thus, the methods of FIGS. 3 and 4 together re-associate paired, partner sessions at respective existing sockets of the pipe being replaced to the replacement sockets of the replacement pipe, thereby preserving the paired relationship between the partner sessions. By re-associating the paired sessions of the socket pair of the original pipe (i.e., Socket 1 and the identified partner socket) to the replacement socket pair of the replacement pipe, the session tokens, which are already allocated to tasks and/or data in a messaging sequence, remain valid and can be used for data transfer from the replacement sockets.

At step 460, the method sends confirmation that the replacement pipe for the socket-based connection is established. In accordance with example implementations of the present disclosure, the method may send the above-described confirmation received in step 340 of the method of FIG. 3. Thus, for example, the method may send a final acknowledgement of a messaging sequence to the remote component or device. For example, the final acknowledgement may confirm that a new partner socket has been opened as a permanent replacement socket, thus indicating that the new pipe is fully established as the replacement. The final acknowledgement may also confirm that activity of the identified partner socket has been terminated.

At step 470, the method receives confirmation from the remote component or device that the remote socket of the existing connection is closed. For example, the confirmation may be sent in accordance with step 370 of the method of FIG. 3.

At step 480, the method closes the identified socket. Step 480 may further update the status of the identified socket and the replacement socket associated with the replacement pipe and send an acknowledgement to the remote component or device. For example, a socket status monitor may mark a data record associated with the identified socket to indicate that status of the socket as closed, and may mark a newly created data record associated with the new socket as available. The acknowledgement may comprise a final message of a messaging sequence, confirming that establishment of the replacement pipe is complete and it is ready for use. Thus, the identified socket and its counterpart (i.e., the remote socket/Socket 1) are now closed, and the replacement socket pair and associated replacement pipe are now available for use. Accordingly, data relating to tasks 40 can now be transmitted across the replacement pipe. The method then ends at step 485.

Whilst the steps of the method of FIG. 4 may be performed entirely by the enhanced socket handler of a node (i.e., a component or device of a system or network) as shown in FIG. 2, the skilled person will appreciate that parts of the process may be performed elsewhere, such as by the connection manager. Accordingly, as described above, the request to establish the replacement pipe may be received by the enhanced socket handler in step 410. Processing may then be transferred to the connection manager to identify the partner socket and suspend use thereof in steps 420 and 440. Thereafter processing may be transferred back to the enhanced socket handler, which may perform steps 440 to 480. In this way, no addition processing is required by the connection manager, which continues to allocate sessions to new tasks based on the availability of sessions and sockets. As the skilled person will appreciate, the steps of the method of FIG. 4 may be carried out in various orders and by various suitable processing components or modules associated with the node comprising the partner socket to the malfunctioning or stalled socket.

Whilst the present disclosure relates to systems, in particular comprising transaction processing systems comprising servers and/or associated monitors, the techniques described herein may be used in conjunction with other suitable types of components or devices forming a node of a computing system or network. Moreover, the present disclosure uses the terms "first system" and "second system", with reference to FIG. 2, for convenience of description only. As the skilled person will appreciate, the above-described arrangement and function of the first and second systems 10, 20, and, in particular, the connection manager and enhanced socket handler thereof, are typically present and required in both the first and second systems. Thus, the connection manager 12 and enhanced socket handler 60 of the first system 10 may perform a method in accordance with the example implementation of FIG. 4, and the connection manager 22, enhanced socket handler 62 and socket status monitor (not shown) of the second system 20 may perform the method in accordance with the example implementation of FIG. 3.

Moreover, whilst the methods of FIGS. 3 and 4 are described above as separate processes performed at different nodes of a system or network, the skilled person will appreciate that the methods of FIGS. 3 and 4 may be implemented concurrently, for example by a connection manager and enhanced socket handler, at a single node. In particular, each node may both send and receive requests to establish a replacement socket and pipe based on detected malfunctioning or stalled sockets associated with different connections and/or connection pipes. Accordingly, the methods of FIGS. 3 and 4 may be performed in combination, for example when handling different messaging sequences for establishing replacement pipes.

Figure 5:
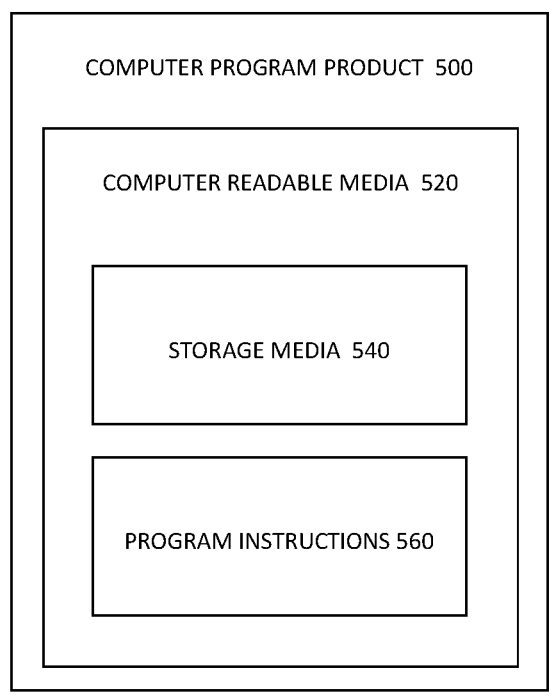
FIG. 5 is a block diagram of a computer program product in accordance with an example implementation of the present disclosure.

FIG. 5 is a block diagram of a computer program product 500 in accordance with an example implementation of the present disclosure. The computer program product 500 may include computer readable media 520 having storage media 540 and program instructions 560 (i.e., program code) embodied therewith. The program instructions 560 may be loaded onto memory associated with a node of a system or network, such as an enhanced socket handler and/or connection manager of a transaction processing system. The program instructions 560 may be executable by a processor associated with the node to perform a method in accordance with example implementations of the present disclosure, for example as described above with reference to FIG. 3 and/or FIG. 4.

In summary, the present disclosure provides additional functionality for modified enhanced socket handling to enable automatic replacement of a connection pipe of a socket-based connection, when the connection pipe, or a socket providing access thereto, is failing. In particular, the functionality may be provided as software, firmware and/or hardware, and may be provided as an upgrade to legacy systems and devices or integrated within new systems and devices. The functionality may be provided in an enhanced socket handler component and/or a connection manager, of each system or device node, as in the described example implementations. The teachings of the present disclosure enable the replacement of a connection pipe, and corresponding socket pair providing access thereto, whilst other connection pipes of the same connection continue to operate normally. In addition, replacement of connection pipe in accordance with the teachings of the present disclosure may be implemented automatically, for example in response to detection of an associated problem such as a malfunctioning or stalling socket. Upon establishment of the replacement pipe, data communication of already scheduled messages and/or data may continue seamlessly using the replacement pipe, without significant delay. No additional connection management processing is required, such as the re-allocation of queued tasks and data to new sessions of the replacement connection pipe. Moreover, only one messaging sequence or task, namely the messaging sequence or task accessing the connection pipe at the time of detection of the problem, may fail and thus lead to an error recovery procedure. Thus, the number of errors arising due to the failure is minimized.

The present disclosure is advantageous in relation to long-lived, peer to peer "stateful" connections that support the use of multiple pipes that make up a single connection. However, other applications that might benefit from the teachings of the present disclosure are possible and contemplated.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A computer-implemented method preferable by a first system, the first system for communicating data with a second system over at least one socket-based connection, wherein the at least one socket based connection includes a first existing connection pipe between the first system and the second system, wherein the first system communicates with the second system over the first existing connection pine by at least accessing the first existing connection pipe via a first existing socket of the first system, wherein the second system communicates with the first system over the first existing connection pipe by at least accessing the first existing connection pipe via a first existing socket of the second system, the method comprising:

initiating, by the first system, a process for establishing a second connection pipe of the at least one socket-based connection between the first system and the second system, wherein the second connection pipe is a new connection pipe that is a replacement for the first existing connection pipe;

receiving, by the first system, acknowledgement from the second system, the acknowledgement confirming that the second connection pipe is established between the first system and the second system, wherein the first system communicates with the second system over the second connection pipe by at least accessing the second connection pipe via a second existing socket of the first system, wherein the second system communicates with first system over the second connection pipe by at least accessing the second connection pipe via a second existing socket of the second system, wherein the second existing socket of the first and second system replaces the first existing socket of the first and second system; and re-associating, by the first system, sessions of the first existing socket at the first system to the second existing socket at the first system.

2. The method of claim 1, wherein the process for establishing a second connection pipe comprises a messaging sequence between the first system and the second system, the messaging sequence including an indicator that the second connection pipe is to replace first existing connection pipe and including an identifier for at least one socket associated with the first existing connection pipe.

3. The method of claim 2, wherein initiating a process for establishing a second connection pipe comprises sending a request message from the first system to the second system, wherein the request message at least includes:

a request to establish a new connection pipe on the at least one socket-based connection between the first system and the second system;

the indicator that the new connection pipe is to replace the first existing connection pipe; and the identifier for at least one first socket associated with the first existing connection pipe.

4. The method of claim 3, wherein messaging sequence comprises an enhanced capability exchange (CAPEX) messaging sequence.

5. The method of claim 1, further comprising:

receiving, by the first system, an indication that the first existing socket at the first system is failing, and initiating the process for establishing a second connection pipe in response to receiving the indication that the first existing socket of the first system is failing.

6. The method of claim 5, further comprising:

suspending, by the first system, use of the first existing socket of the first system, in response to receiving the indication that the first existing socket of the first system is failing.

7. The method of claim 1, further comprising:

closing, by the first system, the first existing socket at the first system.

* * * * *